(12) United States Patent
Das et al.

(10) Patent No.: US 12,466,970 B2
(45) Date of Patent: Nov. 11, 2025

(54) NANO-INKS OF CARBON NANOMATERIALS FOR PRINTING AND COATING

(71) Applicant: Kansas State University Research Foundation, Manhattan, KS (US)

(72) Inventors: Suprem R. Das, Manhattan, KS (US); Wenjun Xiang, Manhattan, KS (US); Anand P. S. Gaur, Manhattan, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 115 days.

(21) Appl. No.: 17/621,762

(22) PCT Filed: Jun. 25, 2020

(86) PCT No.: PCT/US2020/039547
§ 371 (c)(1),
(2) Date: Dec. 22, 2021

(87) PCT Pub. No.: WO2020/264110
PCT Pub. Date: Dec. 30, 2020

(65) Prior Publication Data
US 2022/0363931 A1 Nov. 17, 2022

Related U.S. Application Data

(60) Provisional application No. 62/954,118, filed on Dec. 27, 2019, provisional application No. 62/866,412, filed on Jun. 25, 2019.

(51) Int. Cl.
C09D 11/52 (2014.01)
C09D 11/36 (2014.01)
(Continued)

(52) U.S. Cl.
CPC .............. *C09D 11/52* (2013.01); *C09D 11/36* (2013.01); *C09D 11/38* (2013.01); *H01G 4/252* (2013.01)

(58) Field of Classification Search
CPC ............................ C09D 11/52; B41J 2202/04
See application file for complete search history.

(56) References Cited

U.S. PATENT DOCUMENTS 9,440,857 B2    9/2016  Sorensen et al.
10,876,210 B1 * 12/2020  Claussen ................ H05K 1/092
(Continued)

FOREIGN PATENT DOCUMENTS

CN    103113786    5/2013
CN    104212242    12/2014
(Continued)

OTHER PUBLICATIONS

Secor et al., "Inkjet Printing of High Conductivity, Flexible Graphene Patterns," The Journal of Physical Chemistry Letters, Published Apr. 8, 2023, pp. 1347-1351 (Year: 2013).*
(Continued)

Primary Examiner — Shelby L Fidler
(74) Attorney, Agent, or Firm — Hovey Williams LLP

(57) ABSTRACT

Electrically conductive ink compositions are provided that comprise at carbon nanomaterials of one-dimensional, two-dimensional, and quasi-three-dimensional nanostructures and/or their combinations, and/or doping with elements such as nitrogen, boron, sulfur, in certain ratios. The carbon nanomaterials are selected from the group consisting of graphene and graphene oxide particles, carbon nanotubes, and graphene aerosol gels.

19 Claims, 11 Drawing Sheets

(51) Int. Cl.
   *C09D 11/38*   (2014.01)
   *H01G 4/252*   (2006.01)

(56) References Cited

U.S. PATENT DOCUMENTS

| | | | |
|---|---|---|---|
| 2012/0097903 A1* | 4/2012 | Scheffer | C09D 7/63 252/511 |
| 2014/0334065 A1 | 11/2014 | Lee et al. | |
| 2014/0335010 A1 | 11/2014 | Sorensen et al. | |
| 2017/0081537 A1 | 3/2017 | Hersam et al. | |
| 2018/0010260 A1 | 1/2018 | Hersam et al. | |
| 2018/0086932 A1 | 3/2018 | Hersam et al. | |
| 2020/0239806 A1* | 7/2020 | Kim | C10M 107/38 |

FOREIGN PATENT DOCUMENTS

| | | |
|---|---|---|
| CN | 105001716 | 10/2015 |
| CN | 106221378 A * | 12/2016 |
| CN | 107163686 | 9/2017 |
| CN | 107674505 | 2/2018 |
| JP | 2016-505077 | 2/2016 |
| JP | 2017-502495 | 1/2017 |
| WO | 2013066269 | 5/2013 |
| WO | 2014210584 | 12/2014 |
| WO | 2017035193 | 3/2017 |

OTHER PUBLICATIONS

European Search Report in corresponding EP20833675.0-1102, dated Jun. 7, 2023.
International Search Report and Written Opinion in corresponding PCT/US2020/039547, dated Nov. 16, 2020.
Office Action of Corresponding Chinese Application 202080047356.4 dated Sep. 8, 2023.
Notification of Reasons for Refusal of corresponding Japanese Patent Application Serial No. 2021-576393, dated Feb. 6, 2024 (English translation attached).

* cited by examiner

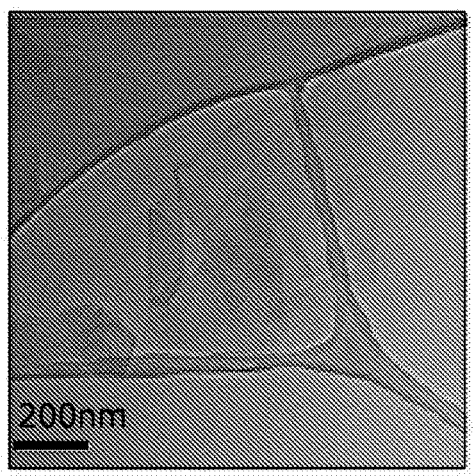
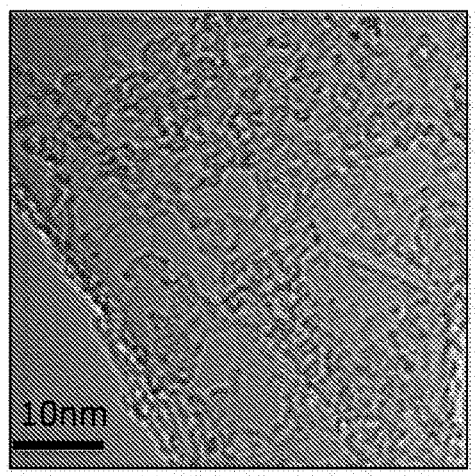
FIG. 5a  FIG. 5b
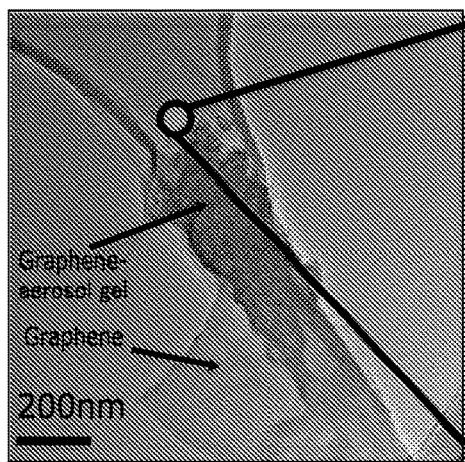
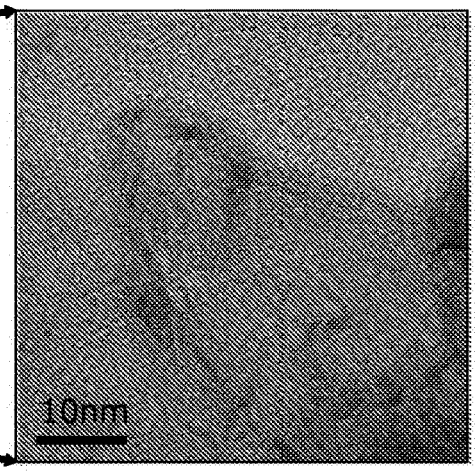
FIG. 5c  FIG. 5d
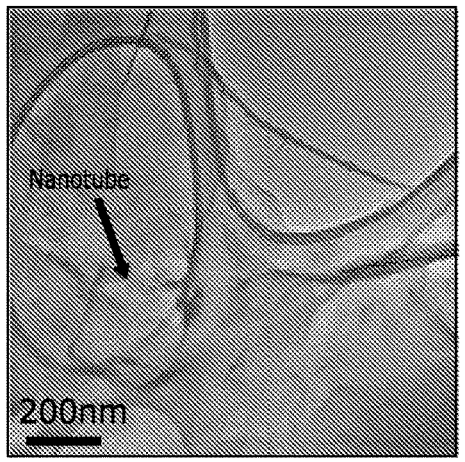
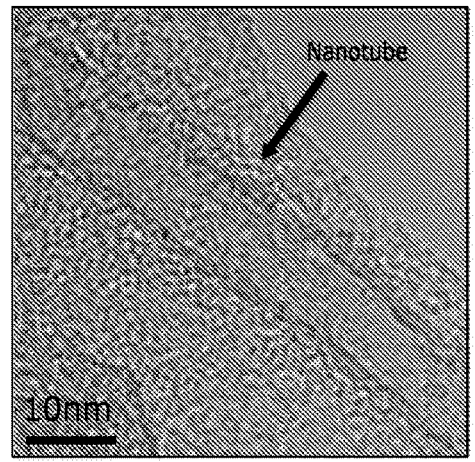
FIG. 5e  FIG. 5f

NANO-INKS OF CARBON NANOMATERIALS FOR PRINTING AND COATING

RELATED APPLICATIONS

This application claims the benefit of U.S. Provisional Patent Application No. 62/866,412, filed Jun. 25, 2019, and U.S. Provisional Patent Application No. 62/954,118, filed Dec. 27, 2019, both of which are incorporated by reference herein in their entireties.

STATEMENT REGARDING FEDERALLY SPONSORED RESEARCH

CROSS-REFERENCE TO RELATED APPLICATIONS

The present application is the U.S. National Stage of International Patent Application No. PCT/US2020/039547, filed Jun. 25, 2020, which claims the benefit of U.S. Provisional Patent Application No. 62/866,412, filed Jun. 25, 2019, and U.S. Provisional Patent Application No. 62/954,118, filed Dec. 27, 2019, both of which are incorporated by reference herein in their entireties.

BACKGROUND OF THE INVENTION

Field of the Invention

The present invention is directed toward the formulation of various electronic grade inks and/or dispersions comprising, consisting of, or consisting essentially of carbon nanomaterials of one-dimensional, two-dimensional, and quasi-three-dimensional nanostructures and/or their combinations in certain ratios. These inks can be used in number of applications, including but not limited to, printable and flexible electronics and functional coatings. Preferred applications for these inks are in the areas of energy storage, electrochemical sensing, field effect transistors, and transparent conducting electrodes. The process is scalable, making it suitable for large scale production/manufacturing.

Description of the Prior Art

Rechargeable and micro-scale energy storage devices such as micro-supercapacitors (micro-SCs) and micro-batteries have been increasingly demanded due to emerging applications such as the Internet of Things (IoT), autonomous and ubiquitous sensors, small consumer electronics, including the wearable devices. Based on the principles of electrical double layer capacitances (EDLCs) and redox active reactions at the solid-electrolyte interfaces, the energy storage devices have characteristics of charging and discharging. Therefore, charging-discharging cycles with reliability constitute the essential features of any super/micro-supercapacitor technology and battery technology. Graphene has been long sought for energy storage applications due to its large surface area (2630 $m^2/g$ for isolated single sheet of graphene). However, exploiting the property in a large scale and scalable platform with its thickness control has been challenging due to interparticle resistance, mechanical instability, and their correlations. Alternate approaches of modifying the physical structure of graphene in micro/nanoscale (e.g., by increasing available surface area exposed to environment) to combinedly alleviate these adverse effects as well as exploit advantages of harnessing higher EDLCs would be beneficial for development of new technology avenues. Various types of additive manufacturing, such as screen printing, inkjet printing, and 3D printing have been increasingly adopted recently due to their cost effectiveness, manufacturing simplicity, and wide range of compatibilities in processes. Therefore, a need exists in the art to be able to print graphene micro-SCs and micro-batteries with micro/nanoscale engineered surfaces with available higher surface area in order to achieve the next generation of SCs and batteries mentioned above.

U.S. Patent Application Publication No. 2017/0081537 is directed toward a rapid, scalable methodology for graphene dispersion and concentration with a polymer-organic solvent medium, as can be utilized without centrifugation, to enhance graphene concentration.

International Patent Application Publication No. WO 2014/210584 is directed toward a dispersion of nanoplatelet graphene-like material, such as graphene nanoplatelets, in a solid or liquid dispersion media wherein the nanoplatelet graphene-like material is dispersed substantially uniformly in the dispersion media with a graphene-like material dispersant. Such dispersions may be used to prepare articles by three-dimensional (3D) printing, as well as to provide electrically conductive inks and coatings, chemical sensors and biosensors, electrodes, energy storage devices, solar cells, etc. Liquid dispersions may be prepared, for example, by sonication of solutions of graphite flakes, dispersant, and liquid dispersion media, while solid dispersions may be prepared, for example, by combining the melted polymer with the liquid dispersion, dissolving the solid polymer in a miscible solvent and then blending with the liquid dispersion, dissolving the solid polymer in the liquid dispersion, or polymerizing one or more monomers in the liquid dispersion to form the solid polymer.

U.S. Pat. No. 9,440,857 is directed toward a method of producing pristine graphene particles through a one-step, gas-phase, catalyst-free detonation of a mixture of one or more carbon-containing compounds hydrocarbon compounds and one or more oxidizing agents is provided. The detonation reaction occurs very quickly and at relatively high temperature, greater than 3000 K, to generate graphene nanosheets that can be recovered from the reaction vessel, such as in the form of an aerosol. The graphene nanosheets may be stacked in single, double, or triple layers, for example, and may have an average particle size of between about 35 to about 250 nm.

Each of the foregoing references is hereby incorporated by reference in its entirety.

SUMMARY OF THE INVENTION

In one embodiment, graphene aerosol gel ink has been formulated and used in inkjet printing of micro-supercapacitors. In certain embodiments, the graphene aerosol gel used was synthesized by controlled environment detonation of hydrocarbons, e.g., methane, ethylene, and acetylene.

In another embodiment, an ink composition is provided comprising a nanomaterial selected from the group consisting of graphene, carbon nanotubes, and graphene aerosol gel. In a preferred embodiment, the ink composition comprises, consists of, or consists essentially of graphene aerosol gel as the predominant or sole graphitic carbon or graphene material.

According to yet another embodiment of the present invention there is provided a method of forming an ink composition comprising providing a mixture comprising a graphene aerosol gel and a surfactant, preferably ethyl cellulose or nitrocellulose. The mixture is dispersed within a liquid vehicle system, the liquid vehicle system preferably comprising a mixture of one or more ketones and one or more alcohols, and more preferably a mixture of cyclohexanone and terpineol.

In another embodiment of the present invention, an ink composition is provided comprising graphene or graphene oxide and include a small concentration of a secondary element, such as carbon nanotubes or graphene aerosol gels or their combination. The base graphene inks used in the studies described below are a commercially available graphene ink and a home-made graphene ink. The carbon nanotubes used for making the composite ink are commercially available and the graphene aerosol gel used for the composite ink is made in accordance with the teachings of U.S. Pat. No. 9,440,857, which is incorporated by reference herein in its entirety. The carbon nanotubes are multiwalled carbon nanotubes that possess metallic characteristics and the graphene aerosol gel is reduced graphene oxide with a controlled carbon to oxygen ratio, when synthesized via a hydrocarbon detonation route.

According to still another embodiment of the present invention a method of forming an ink composition is provided comprising providing a graphene or graphene oxide-containing ink precursor comprising a quantity of graphene or graphene oxide particles dispersed in a liquid vehicle. A quantity of at least one of carbon nanotubes and a graphene aerosol gel is dispersed within the ink.

After the inclusion of carbon nanotubes and graphene aerosol gel in the graphene inks, the resulting nano-inks demonstrate unique characteristics in terms of their structural, electrical and electrochemical properties. Both coated surfaces and printed patterns were tested on flexible substrates, such as polyimide films, and the results were obtained. The superior electronic and electrochemical pathways for technologies are useful for applications such as electronics, sensing, energy, and the IoT.

BRIEF DESCRIPTION OF THE DRAWINGS

FIGS. 5a, 5c, and 5e are TEM images of the constituent nanostructures and their mixing in nanoscale for graphene flakes, graphene aerosol gel mixed and wrapped with graphene, and carbon nanotubes mixed and wrapped with graphene, respectively;

FIGS. 5b, 5d, and 5f are high resolution TEM images of graphene, graphene aerosol gel in intimate contact with graphene, and carbon nanotube in intimate contact with graphene, respectively;

DETAILED DESCRIPTION OF THE PREFERRED EMBODIMENT

Embodiments of the present invention are directed toward nano-inks, and methods of making such nano-inks, comprising, consisting of, or consisting essentially of a very stable suspension containing a hybrid structure of 2D graphene, 1D nanotubes and/or 3D aerosol gels, all of which are in microscopic dimensions and composed of carbon as basic chemical element. In certain embodiments, various energy storage devices, in the form of mechanically flexible supercapacitors fabricated (printed) from graphene ink and graphene aerosol gel ink on polyimide substrates are provided (in interdigitated electrode (IDE) form).

According to one or more embodiments, an ink composition is provided that comprises graphene (including reduced graphene oxide), carbon nanotubes, and/or graphene aerosol gel (GAG), referred to generally as a "carbon nanomaterials", dispersed in a liquid vehicle. The graphene and/or carbon nanotubes may be prepared according to any technique known in the art. In the case of graphene, a high sheer force in combination of specific solvent types and ratio enables the exfoliation of graphite when used within the solvent medium with certain concentration of graphene to the solvent. Graphene aerosol gel may be prepared via a catalyst-free, electric spark-initiated detonation of acetylene precursor ($C_2H_2$) with a controlled amount of oxygen within a reaction chamber. An exemplary process for producing GAG is described in U.S. Pat. No. 9,440,857. The process described in the '857 patent may be understood as a conversion of acetylene molecules to free carbon atoms or ions, followed by carbon aerosol formation, graphitic carbon formation, and subsequently undergoing a gelation process to form a gel.

In one or more embodiments, the liquid vehicle in which the carbon nanomaterial is dispersed comprises one or more organic compounds that are compatible with the carbon nanomaterial. In particular embodiments, the liquid vehicle comprises one or more ketones, one or more alcohols, or a mixture of one or more ketones and one or more alcohols. Exemplary ketones that may be used in accordance with the present invention include aliphatic and aromatic cyclic ketones, such as cyclohexanone. Exemplary alcohols that may be used in accordance with the present invention include aliphatic and aromatic alcohols, such as terpineol. In other embodiments, the liquid vehicle may comprise an amide, such as N,N-dimethylformamide (DMF) and/or a lactam, such as N-methyl-2-pyrrolidone (NMP).

In certain embodiments, the liquid vehicle comprises from about 60% to about 99% by weight, from about 70% to about 95% by weight, or from about 80% to about 90% by weight of the one or more ketones. In certain embodiments, the liquid vehicles comprise from about 1% to about 35% by weight, from about 5% to about 30% by weight, or from about 10% to about 20% by weight of the one or more alcohols.

Figure 11:
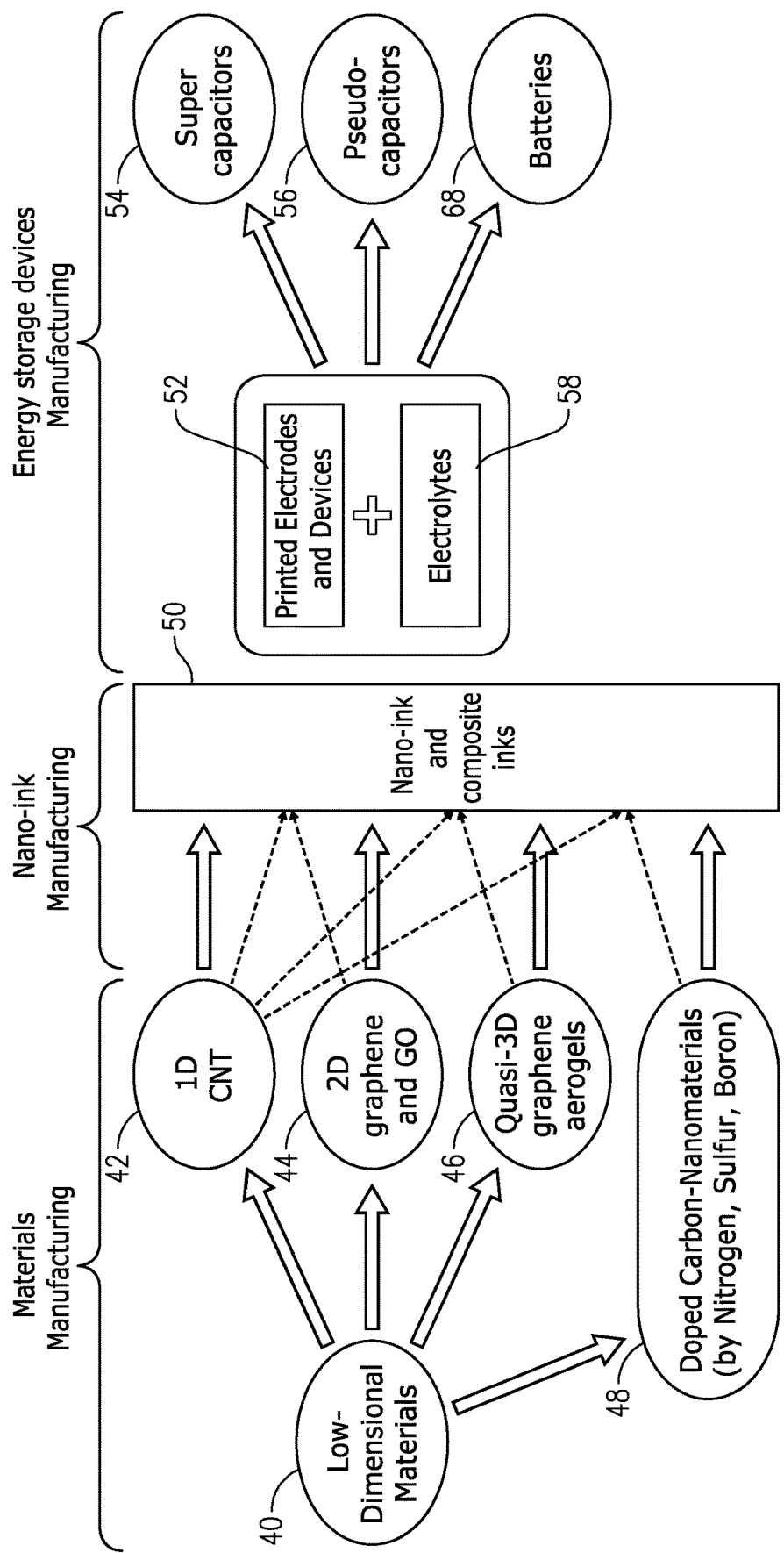
FIG. 11 is an illustration of various aspects of the present invention from material and ink formation to creation of energy storage devices.

In one or more embodiments, when the carbon nanomaterial comprises carbon nanotubes and/or graphene aerosol gel particles, the concentration of these carbon nanomaterial in the ink is from about 0.01 to about 10 mg/ml, from about 0.05 to about 5 mg/ml, or from about 0.1 to about 3.0 mg/ml. In certain embodiments, in addition to CNTs and/or GAG particles, the ink composition may further comprise graphene (including reduced graphene oxide) and/or graphene oxide particles, and/or doped carbon nanomaterials by doping elements such as nitrogen, sulfur, and boron (FIG. 11). In such embodiments the concentration of the graphene and/or graphene oxide particles is from about 1 to about 30 mg/ml, from about 5 to about 25 mg/ml, or from about 10 to about 15 mg/ml.

In certain embodiments, the carbon nanomaterial, and in particular the graphene aerosol gel, has a D90 particle size (where 90% of the distribution has a smaller particle size and 10% has a larger particle size) of from about 0.1 to about 10 microns, from about 0.25 to about 7.5 microns, or from about 0.45 to about 5 microns.

The ink compositions may further comprise one or more optional components. In one or more embodiments, the ink composition may comprise one or more surfactants that help form a stable suspension of the carbon nanomaterial in the liquid vehicle. Exemplary surfactants that may be used with the present invention include ethyl cellulose, nitrocellulose, sodium dodecyl sulfate (SDS), ethylenediaminetetra acetic acid (EDTA) and sodium dodecylbenzene sulfonate (SDBS). In certain embodiments, the ink composition comprises from about 1 to about 500 mg/ml, from about 2 to about 300 mg/ml, or from about 5 to about 200 mg/ml of the one or more surfactants.

In certain embodiments, in order to be jettable from an inkjet printing head, the ink compositions may have a viscosity at room temperature (i.e., about 25° C.) of less than 30 cP, less than 25 cP, or less than 20 cP.

In other embodiments of the present invention, methods of forming composite inks are provided. Exemplary methods are set forth in the Examples, below. However, generally, the composite ink compositions according to the present invention may be formulated via a number of routes. According to one embodiment, a mixture comprising a graphene aerosol gel, as described herein, and one or more surfactants is provided. In certain embodiments, the mixture may be formed by first dispersing a quantity of graphene aerosol gel particles within a liquid medium, such as an organic solvent. In certain embodiments, the organic solvent used may be an alcohol, such as ethyl alcohol. To the GAG dispersion, a quantity of surfactant, such as ethyl cellulose or nitrocellulose, is added. In one or more embodiments, the ratio of GAG to surfactant is from 10:1 to 1000:1, from 25:1 to 500:1, or from 100:1 to 250:1 parts by weight. The GAG is then dispersed within the solvent, using agitation or sonication for a period of time until the GAG particles disintegrate into a plurality of GAG flakes.

Next, the GAG flakes of smaller size are separated from the suspension by, for example, centrifugation. The GAG flakes contained in the supernatant may be flocculated and any excess quantities of surfactant removed. This may be accomplished by preparing a NaCl solution and adding it to the flakes. The resulting suspension may be filtered, and the agglomerated GAG flakes recovered. The retained flakes can be dried and a graphene-surfactant powder recovered. Optionally, larger size GAG flakes can be removed from the powder by re-dispersing the dry powder in an organic solvent and filtering the dispersion. The permeate comprising GAG flakes which passed through the filter can be flocculated as in the previous step and dried to form a powder.

Finally, the composite ink can be formed by dispersing the GAG flake and surfactant powder in a liquid vehicle system, such as described above. The dispersion can then be agitated, such as through use of sonication, in order to form a homogenous ink composition.

According to another embodiment of the present invention, a composite ink can be formulated by first providing a graphene or reduced graphene oxide dispersion. An exemplary reduced graphene oxide dispersion can be formed by mixing reduced graphene oxide particulates with a liquid vehicle system, such as a mixture of cyclohexanone and terpineol as described above. In certain embodiments, the reduced graphene oxide particles are present in the vehicle system at a concentration of from about 1 to about 30 mg/ml, from about 5 to about 20 mg/ml, or from about 10 to about 15 mg/ml. A quantity of surfactant may then be added to the mixture at a level of from about 0.5 to about 15 mg/ml, from about 1 to about 10 mg/ml, or from about 3 to about 5 ml. The resulting mixture can be agitated, such as through sonication, under elevated temperature conditions, not to exceed 400° C., to form the ink suspension. In one or more embodiments, a quantity of CNTs or GAG particles may be added to the ink formulation at a level of from about 0.01 to about 5 mg/ml, from about 0.05 to about 2.5 mg/ml, or form about 0.1 to about 1 mg/ml. The resulting mixture can then be sonicated to form a stable suspension.

The composite inks can be used to create electronic devices that comprise one or more traces printed with the ink. In certain embodiments, the ink printed upon a substrate using an inkjet printer, although, any printing technique capable of creating a trace of desired dimensions could be used. Exemplary electronic devices that can be created with the composite inks include capacitors, supercapacitors, micro-capacitors, ultracapacitors, and pseudocapacitors. In certain embodiments, the inks can be used to print electrodes, which when combined with one or more electrolytes can be used to create batteries.

In one or more embodiments, the electronic devices may be formed by printing a conductive trace on a substrate using any composite ink as described herein. In certain embodiments, the substrate employed is a flexible substrate formed from a synthetic resin material, such as polyimide film. Although, it is within the scope of the present invention for other types of substrates to be used including inflexible substrates such as rigid plastics, glass, and ceramics. In certain embodiments, once the conductive trace is created, the trace can be annealed. The annealing step may be performed at a temperature of from about 200° C. to about 500° C., from about 300° C. to about 450° C., or at about 350° C. under an inert atmosphere, such as a nitrogen atmosphere. The annealing step may be carried out over a period of time from about 1 to about 5 hours.

FIG. 11 schematically depicts various concepts according to the present invention beginning with the manufacture of the carbon nanomaterial, through formulation of nano-inks and composite inks, and creation of energy storage devices. The first stage involves the manufacture the carbon-based nanomaterials from at least one low-dimension material 40. An exemplary low-dimension material is graphite, or one or more organic reactants, such as hydrocarbon compounds, that can be used to synthesize the nanomaterials. From low-dimension material 40, various nanomaterials can be produced such as one-dimensional carbon nanotubes 42, two-dimensional graphene and graphene oxide sheets 44, quasi-three-dimensional graphene aerosol gels 46, or various doped carbon-nanomaterials 48. The doped carbon nanomaterials may comprise, for example, any of nanomaterials 42, 44, or 46 which further comprise nitrogen, boron, or sulfur atoms as dopants.

The nanomaterials, 42, 44, 46, 48 can then be used to formulate nano-inks and composite nano-inks 50. The nano-inks 50 can then be used in the manufacture of various energy storage devices such as printed electrodes 52 from which supercapacitors 54 and pseudocapacitors 56, for example, can be produced. The printed electrodes 52 can also be used in conjunction with one or more electrolytes 58 to construct batteries 60.

EXAMPLES

The following examples describe various embodiments of the present invention, and in particular ink compositions comprising graphene, reduced graphene oxide, and graphene aerosol gels. They are illustrative of certain concepts that may be used with the present invention and should not be taken as limiting the overall scope thereof. In certain embodiments, the formulation of the nano-ink may begin with a commercially available graphene ink, e.g., graphene inks available from Sigma Aldrich. However, as described below, carbon-containing nanomaterials may be synthesized and formulated into composite ink compositions.

Figure 1:
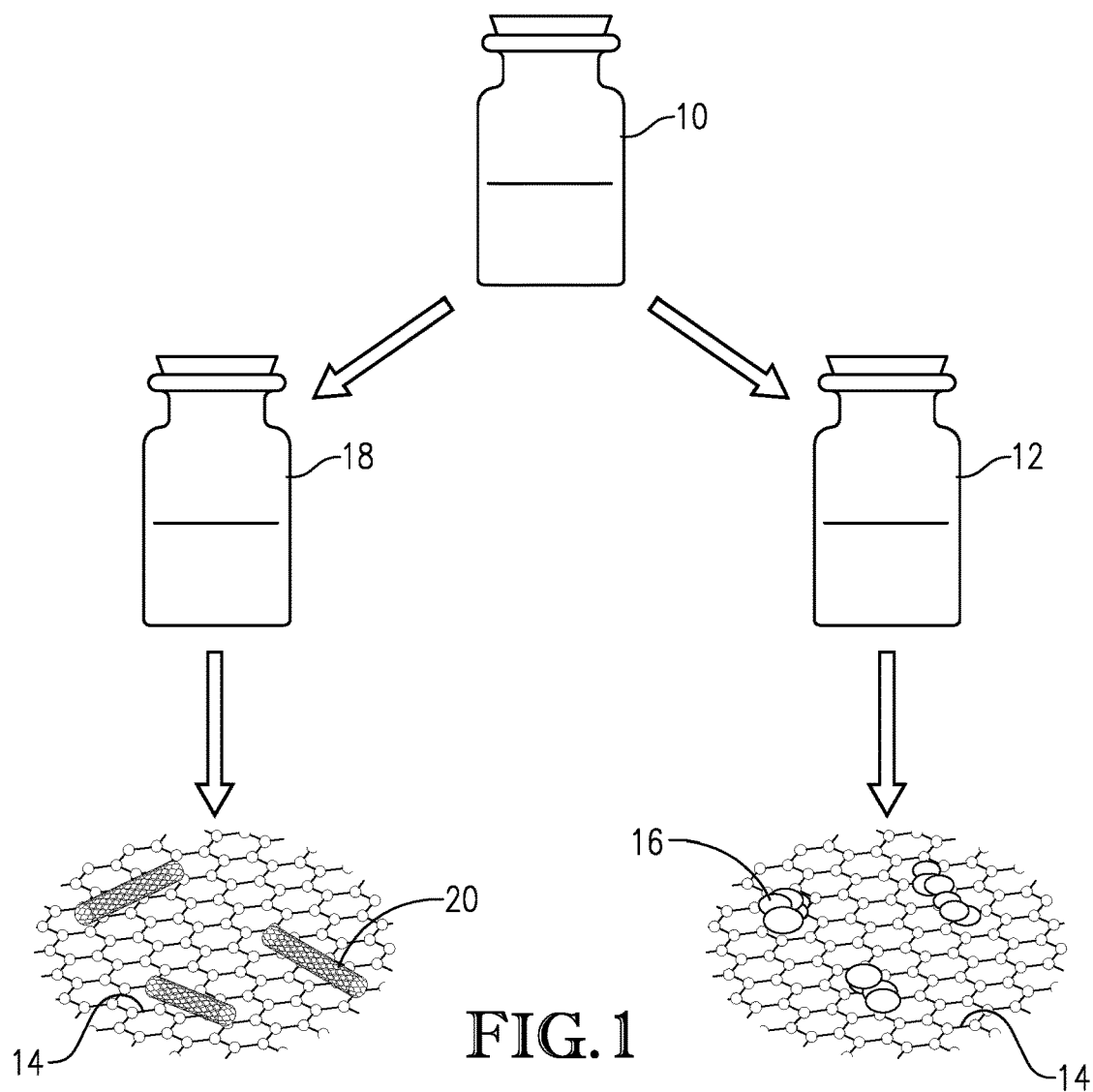
FIG. 1 is a schematic representation of the manufacture of nano-inks according to the present invention.
Figure 2:
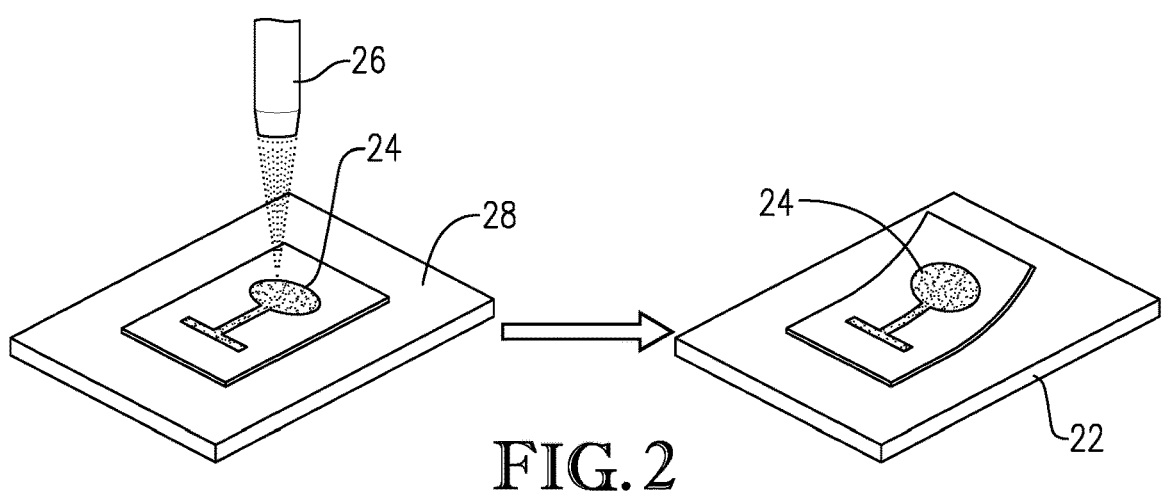
FIG. 2 is a schematic depiction of a printing technique to create an electronic device using the nano-inks according to the present invention.

FIG. 1 schematically depicts processes for creating two graphene-containing inks according to an embodiment of the present invention. In both processes, a graphene ink 10 is used as the base formulation. In one process, graphene aerosol gel is added to a graphene ink base to form a graphene aerosol gel ink 12 that comprises both graphene 14 and graphene aerosol gel particles 16. In a second process, carbon nanotubes are added to the graphene ink 10 to form a graphene-carbon nanotube ink 18 that comprises both graphene 14 and carbon nanotubes 20. It is noted that the carbon nanotubes may comprise single or multi-walled carbon nanotubes. As depicted in FIG. 2, the inks can then be used to fabricate electronic devices 22, such as electrodes, by printing the ink 24 from an inkjet head 26 onto a plastic substrate 28 in the desired configuration.

Example 1—Reduced Graphene Oxide Ink

A reduced graphene oxide ink may be formed using the following steps.

1. 85% by volume of cyclohexanone (Sigma Aldrich) was mixed with 15% by volume of terpineol (Sigma Aldrich) to make a uniform solvent mixture. This solvent mixture forms the vehicle for the ink formulation.

2. The solvent was mixed with reduced graphene oxide (from ACS Materials) with 10-15 mg/mL ratio. Alternatively, commercially available graphene powders (e.g., those available from Graphene Supermarket) can be used.

3. 3-5 mg/mL ethyl cellulose was added to the mixture (ethyl cellulose from Sigma Aldrich).

4. The mixture was bath sonicated overnight with temperature not exceeding 400° C.

5. The mixture was probe sonicated for 60 minutes with 15 minute steps and a rest time of 15 minutes in between at a 30% power set on the probe sonication. Steps were taken to ensure that the temperature did not exceed 400° C.

6. The ink/suspension is further bath sonicated for 10 minutes followed by a vortex mix for ~5 minutes before printing.

Additionally, for the composite nano-ink formulations comprising carbon nanotubes and/or graphene aerosol gels, the following step is also practiced.

7. 0.3 mg/mL of nanotube or graphene aerosol gel is mixed with the graphene ink and the resulting ink is bath sonicated for an hour.

The formulated composite inks with graphene nanosheets and carbon nanotubes (CNTs), and graphene nanosheets and graphene aerosol gels (GAGs) were then used in a material printer (SonoPlot Microplotter II) to fabricate printed electrodes (on flexible and bendable substrates, such as polyimide) for characterization of their electrochemical properties. After the printing process, the electrodes are annealed at 300° C. for 2 hours in a nitrogen atmosphere. A standard hexa-amine ruthenium (III) chloride solution was used as an electrochemical probe to test the printed electrodes. To understand the electron transfer (or, charge transfer) process between nanomaterial surface and solution samples by electrochemical methods, cyclic voltammetry (CV) test was carried out, where a voltage was being swept across the electrode with respect to a standard Ag/AgCl reference potential, and oxidation and reduction currents were being monitored. An oxidation and reduction active surface as the voltage is swept back and forth, an indication of charge transfer, signifies the electroactivity of the surface. The electrodes made by an additively manufactured way (i.e., printed electrodes) of the above composite inks were characterized using this techniques and both the composite inks described above showed significantly active electrochemical signals (an order of magnitude higher), indicating the role of carbon nanotube and graphene aerosol gel additives in graphene inks for manufacturing sensors and energy storage devices. It is believed that this characteristic is attributable to the porous structure of the added nanomaterial, which can provide larger effective reaction surface area. The porous structure as well as network distribution of GAGs and CNTs matrix were confirmed from transmission electron microscope (TEM) imagery.

Figure 3:
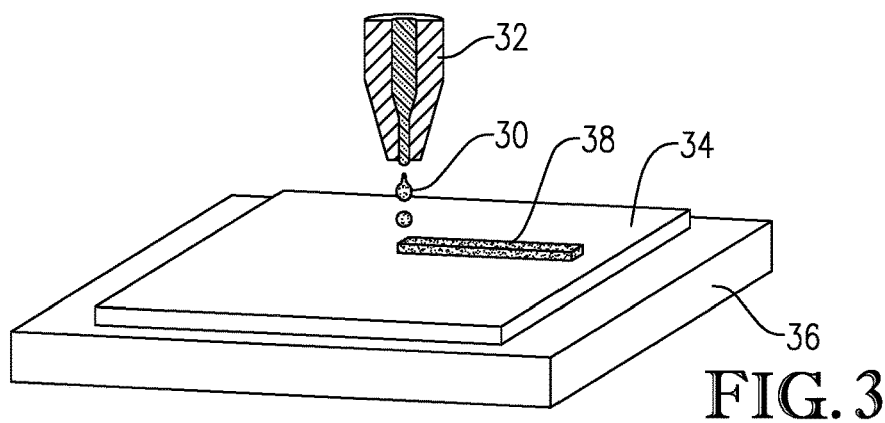
FIG. 3 is a schematic illustration of a drop-on-demand device and a printing process used to manufacture electrodes, sensors, circuits or the like using the nano-inks.

FIG. 3 schematically depicts a drop-on-demand and printing process that can be used to manufacture the graphene electronics, e.g., electrodes, sensors, and circuits. The ink 30 is ejected from inkjet head 32 and deposited on a plastic substrate 34 that rests on the printer plate 36. The strip electrode 38 formed with each ink had its electrochemical and charge transfer characteristics tested.

Figure 4A:
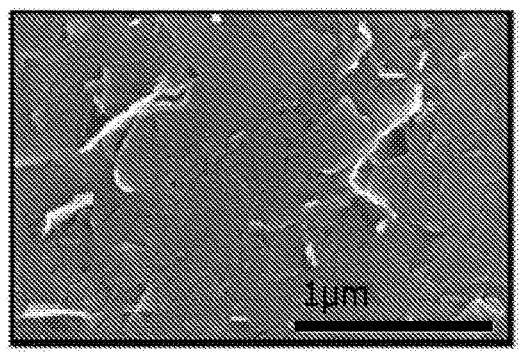
FIG. 4a is an SEM image of a printed sensor using graphene ink.
Figure 4B:
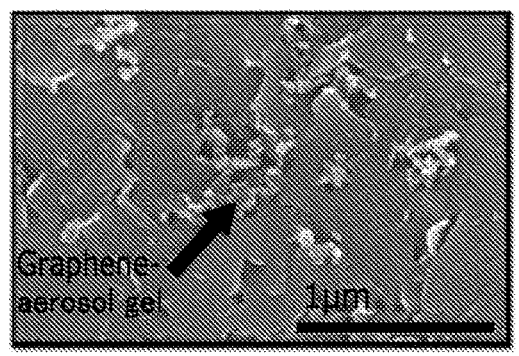
FIG. 4b is an SEM image of a printed sensor using a composite ink comprising graphene and graphene aerosol gel.
Figure 4C:
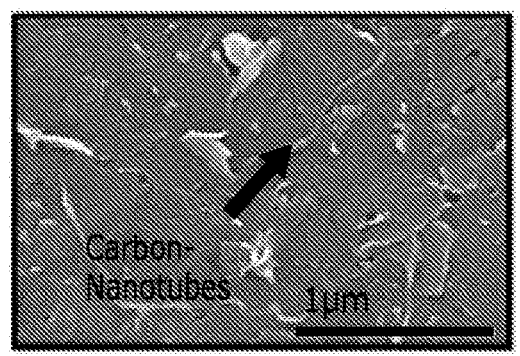
FIG. 4c is an SEM image of a printed sensor using a composite ink comprising graphene and carbon nanotubes.

FIGS. 4a-c depict the surface microstructures of the printed sensors measured using scanning electron microscope imaging (SEM). The three sensors comprise, consist of, or consist essentially of (a) graphene, (b) composite graphene and graphene aerosol gel, and (c) composite graphene and carbon nanotubes. Isolated and/or smaller clusters of graphene aerosol gels and individual carbon nanotubes are shown intimately connected with host graphene flakes, providing additional surface characteristics, which is also evident from electrochemical activities, as discussed below. The density of the aerosol gel and carbon nanotube was kept intentionally small to avoid the aggregation of the nanostructures that will potentially impact adversely on their functionalities.

FIGS. 5a-d are TEM images that depict the constituent nanostructures and their mixing in nanoscale in the three inks. FIGS. 5a, c, and e show the TEM images of the graphene flakes, graphene aerosol gel mixed and wrapped with graphene, and carbon nanotubes mixed and wrapped with graphene, respectively. FIGS. 5b, d, and f show the high-resolution graphene, graphene aerosol gel intimate contact with graphene, and carbon nanotube (sub-10 nm) intimate contact with graphene.

Raman spectra were taken on the printed sensors printed with one printing pass using inks comprising (a) graphene; (b) composite graphene with graphene aerosol gel; and (c) composite graphene with carbon nanotubes. Characteristic D-peak, G-peak, and 2D peak were observed at about 1350 $cm^{-1}$, 1580 $cm^{-1}$, and 2700 $cm^{-1}$, respectively, indicating the presence of the carbon nanomaterials' intact molecular and structural vibrational modes.

Figure 6:
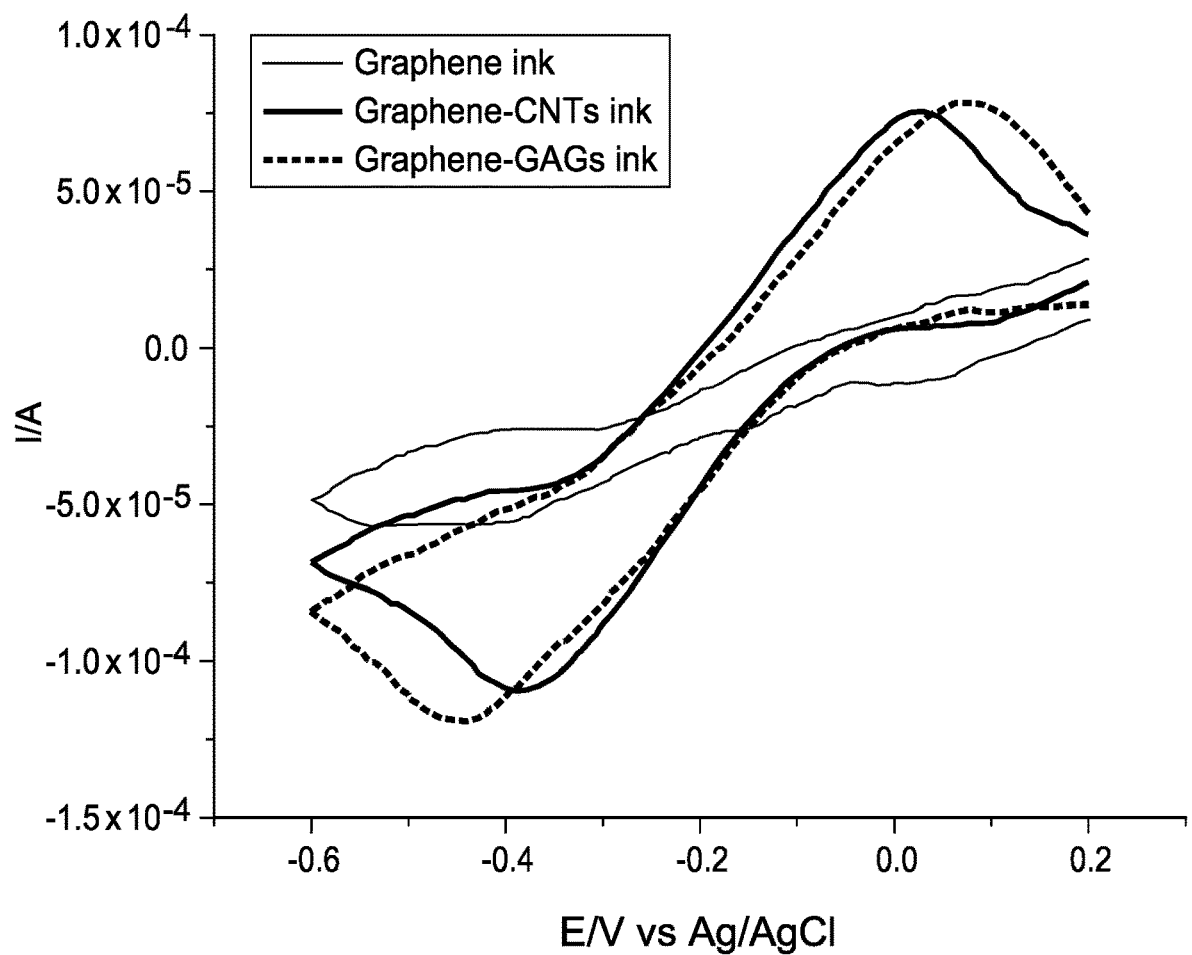
FIG. 6 is a graph of cyclic voltammetry of three sensors printed with graphene ink, composite ink with graphene and graphene aerosol gel, and composite ink with graphene and carbon nanotubes.

FIG. 6 is a graph of the cyclic voltammetry of three printed sensors made with inks comprising graphene (a), composite graphene with graphene aerosol gel (b), and composite graphene with CNTs (c). The sensors were tested with a standard Ag/AgCl reference electrode and standard hexa-ammine ruthenium (III) chloride redox probe. Very distinct and symmetrical oxidation and reduction peaks were observed when the graphene ink contains graphene aerosol gel or carbon nanotube additives, indicating the enhanced electroactive nature of the composite inks. The cathodic and anodic currents are orders of magnitude higher for composite inks as compared to the graphene ink. Graphene ink remains weakly interactive with the redox probe.

The cyclic voltammetry of printed sensors comprising the composite graphene with graphene aerosol gel ink and the composite graphene with CNT ink was analyzed at scan rates of 5 mV/s, 10 mV/s, 25 mV/s, 50 mV/s, and 100 mV/s. Graphs were also made showing linear anodic and cathodic characteristics for these two sensors. Although both types show high electrochemical electron transfer, the sensor comprising the carbon nanotube additives showed a slightly higher performance than the sensor with the graphene aerosol gel additive.

The cyclic voltammetry of the composite graphene—graphene aerosol gel and composite graphene—carbon nanotube sensors, respectively, in 5.0 mM glucose in 0.1 M NaOH at various scan rates was also measured. Graphs were also made which depicted corresponding linear cathodic and anodic peak current positions indicating that sensors printed or coated with composite graphene inks could be used for glucose sensors.

Example 2—Formulation of Graphene Ink from Graphite Powders

In another embodiment, a graphene aerosol gel ink maybe formulated as follows.

1. 5 mg/ml ethyl cellulose (viscosity 4 cP) (i.e., 0.25 g) was dispersed in 50 ml ethanol and bath sonicated first. Then 50 mg/ml graphite (ACS Materials) (I.e., 2.5 g) was added in the mixture.

2. The dispersion was probe sonicated for 3 hours with 50% set energy in the probe device (with a 5 sec ON followed by 5 sec OFF setting with the beaker containing the mixture kept in an ice bath)

3. Dispersion was centrifuged at 10,000 g (11641 rmp) for 15 minutes, after which the supernatant was collected.

4. The supernatant was mixed with 0.04 g/ml NaCl with a volume ratio 1:2 followed by heat treating on a hot plate at 50° C. and with stirring with a magnetizer for 5 minutes.

5. To collect powder without residual salt, the graphene/EC solid was washed with deionized water and isolated by vacuum followed by putting it again on the hot plate to dry.

6. Re-disperse the graphene/EC powder in ethanol and filter through 5 µm filter pores.

7. Dispersion mixed with 0.04 g/ml NaCl with a volume ratio 1:2 again followed by stirring with magnetizer for 5 minutes on hot plate.

8. To collect the final powder without residual salt, the graphene/EC solid was washed with deionized water and isolated by a vacuum filtration process. Finally, the product kept on hot plate to dry.

9. Finally, this powder, with 50 to 200 mg/mL concentration, is used in mixture of 85% by volume of cyclohexanone (Sigma Aldrich) and 15% by volume of terpineol (Sigma Aldrich) to make a uniform solvent mixture.

Example 3—Formulation of Graphene Aerosol Gel Ink

In another embodiment, a graphene aerosol gel ink maybe formulated as follows. The following chemicals may be used:
  a. Solvent: ethyl alcohol
  b. Surfactant: ethyl cellulose (product number 200646, Sigma Aldrich, 4 cp 5% in toluene/ethanol 80:20 (lit)).
  c. Graphene aerosol gel: ($O_2/C_2H_2$) ratio=0.5.

Step 1. Suspension of Graphene Aerosol Gel in Solvent:
  a. Pour 50 ml of ethyl alcohol in a clean glass container using the calibrated measuring cylinder and add 250 mg of graphene aerosol gel (i.e., with a concentration of 5 mg/ml). Shake gently for 10-15 minutes.
  b. Add 1.25 gm of ethyl cellulose (i.e., with a concentration of 25 mg/ml).

c. Disperse the graphene aerosol gel within the solvent using the probe sonication kept in ice bath for 1 hour at a 50% watt setting and using a pulse on time 5 sec, pulse off time 5 sec. After this stage, the graphene aerosol gel disintegrates into graphene aerosol gel flakes.

Step 2. Separation of Smaller Graphene Aerosol Gel Flakes:
d. Centrifuge the suspension for 15 min using speed equivalent to 11,000 rpm (10,000 rcf). Decant gently the liquid at the top part of centrifuge vial and collect it in a beaker.

Step 3. Flocculation and Removal of the Excess Surfactants (Ethyl Cellulose):
e. Prepare an aqueous solution of NaCl, concentration 0.04 gm/ml, in deionized water.
f. Add NaCl sol in suspension in keeping the volume ratio 1:2 between suspension and NaCl aqueous sol.
g. Filter the agglomerated graphene aerosol gel via vacuum filtration using 0.45 micrometer pore size filter.
h. Dry the solid powder at 50° C. overnight using a hotplate to get graphene-ethyl cellulose powder.

Step 4. Removal of Bigger Graphene Aerosol Gel Flakes:
i. Re-Disperse the dry powder in ethyl alcohol solvent again and filter it through 5-micron sieve.
j. Flocculate again following the step (e), (f), and (g).
k. Dry it overnight using hot plate at 50° C.

Step 5. Preparation of Final Graphene Aerosol Gel Ink:
l. Add 60 mg of ethyl cellulose-graphene powder slowly in 450 microliters of cyclohexanone and 50 microliters of terpineol mixture.
m. Use bath sonication at room temperature for 15 min to mix the powder in the solvent to get a homogenous and suspended ink.

It was observed that when a smaller concentration of ethyl cellulose was used in the ink formulation, the ink, after printing and thermal annealing, showed better electrical conductivity.

Figure 7:
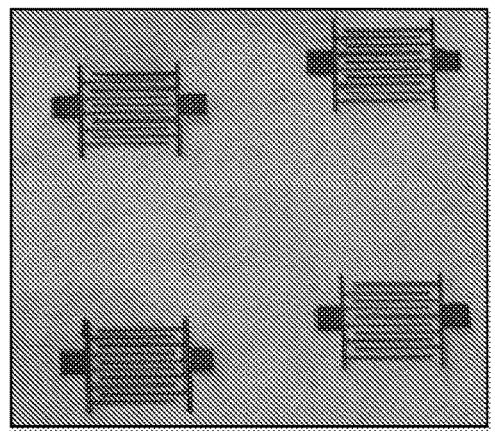
FIG. 7 is an image of ~10 mm×8 mm printed supercapacitors with interdigitated finger shaped electrodes.

FIG. 7 is a photograph of approximately 1 cm×1 cm supercapacitor devices (interdigitated type electrodes) that were printed with aerosol gel ink having a smaller concentration of surfactant. One printed pass was used to print these devices on a polyimide (KAPTON) film with a printer tip diameter of 20 µm. After printing, the devices were annealed at 350° C. in nitrogen for 2 hours.

Nanoscale materials with tunable physical structures uniquely benefit their large surface area exposure to their immediate environment leading to a number of applications, yet, key bottlenecks such as inter-particle electrical resistance and mechanical fracture, surface sensitivity towards undesirable species, and inability in controlling their defects limit their potential for scalable and practical applications such as renewable energies in the form of energy storage devices. Graphene has demonstrated great physical properties in past decade and a half due to its atomic dimensionality (thinness) and special electronic properties with its successful applications in energy and sensing. While the large-scale materials synthesis aspect of graphene has been on high demand in contrast to micro-mechanical exfoliation method, manufacturing of graphene devices and their reliable property exploration are yet to be adopted in industry. In an embodiment of the present invention graphene aerosol gels are used to manufacture stable graphene aerosol gel inks by functionalizing surfactants and employing them for fabrication of printed graphene micro-supercapacitors on wide number of substrate materials, including flexible and bendable substrates such as polyimides. It has been demonstrated that the micro-supercapacitors with superior characteristics are intimately dependent on the effective surface area of the printed electrodes exposed to the electrolytes. As shown in greater detail below, above 80% capacity retention was obtained on the printed micro-supercapacitor electrochemical devices over 10,000 operating cycles with 1-ethyl-3-methylimidazolium tetrafluoroborate electrolytes and with 5-10 µA cm$^{-1}$ discharge current density.

Ink Characterization and Printing

The graphene aerosol gel ink was characterized with a number of methods, including stability test (qualitative observation on settling of the suspension with time), aerosol gel density estimation, electron microscopy measurements, and post printing electrical resistance measurements. For micro-supercapacitors, interdigitated electrodes were printed on polyimide substrates by using SonoPlot Microplotter II with a 20-micron nozzle size at room temperature. Although multiple printing passes could be used to optimize the supercapacitor characteristics, this work focusses on printed supercapacitor devices with single pass writing primarily due to the fabrication of micro-devices for miniaturized power sources. Post printed thermal treatment was done with the devices for 2 hours at 350° C. in an inert ambient environment of 5% hydrogen mixture in nitrogen.

Catalyst-free, electric spark-initiated detonation of acetylene precursor ($C_2H_2$) with a controlled amount of oxygen was conducted in a 4L chamber to synthesize the graphene aerosol gel. The summary process during the detonation could be understood by a conversion of acetylene molecules to free carbon atoms or ions, followed by carbon aerosol formation and subsequently undergoing a gelation process to form a gel, called carbon aerosol gel (CAG). The detailed process of the CAG, graphene aerosol gel and their characterization has been reported previously, where several key parameters such as the layer thickness of the aerosol gel walls, degree of porosity, oxygen to carbon atom ratio, carbon-carbon bonding characteristics (hybridization) etc. are studied. The surface area of the aerosol gel was studied using Brunauer-Emmett-Teller (BET) measurements prior to the aerosol gel ink formulation.

A number of characteristics, such as Raman spectroscopy, x-ray photoelectron spectroscopy, high resolution transmission electron microscopy with local lattice spacing, as well as the diffraction pattern from selective area electron diffraction (SAED) confirmed the graphene characteristics of the ink constituent, assuring the quality of the aerosol gel material. The suspension also retains its particle dispersion without settling it down, confirming the ink quality for extended use at later time. The rheology and particle size of the ink are a few of the most important parameters that determines not only the quality of printed pattern but its physical and mechanical stability.

The micro-supercapacitors shown in FIG. 7 are printed on polyimide substrates with 25-micron thick sheets that are mechanically very flexible and bendable and accommodate a great level of mechanical flexibility. The cells are typically 10 mm×8 mm in these devices and may be further miniaturized.

Figure 8:
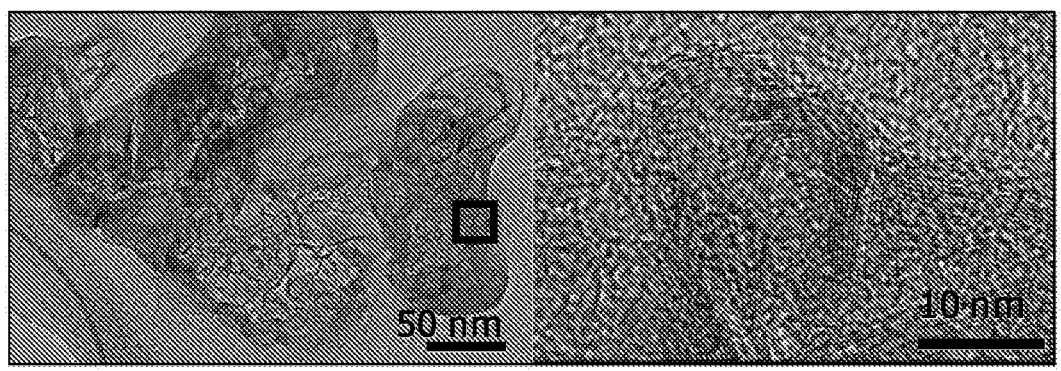
FIG. 8 depicts the transmission electron microscopy (TEM) image of graphene aerosol gel ink with a lower resolution (left) and the high resolution (HR) TEM image (right, imaged at the square marked area on the left image), showing the atomic thin graphene walls in the multi-layer graphene aerosol gel.

FIG. 8 shows the high-resolution transmission electron microscopy (HRTEM) imaging results of the graphene aerosol gel ink. The randomly distributed and the crumbling structure of the aerosol gel particles (left image in FIG. 8) is indicative of the graphene aerosol gel signature. The image on the right side (FIG. 8) is a zoomed in view of the graphene aerosol gel located in a region indicated by the circular area on the left side image. The image shows number of layers of graphene present in the typical aerosol gel particle used in the ink (7 to 10 parallel lines are visible from the TEM). It is important to realize that this unique structure along with the reliability in the printing qualities (mechanical integrity) are the vital components for the development of the energy storage devices.

Figure 9:
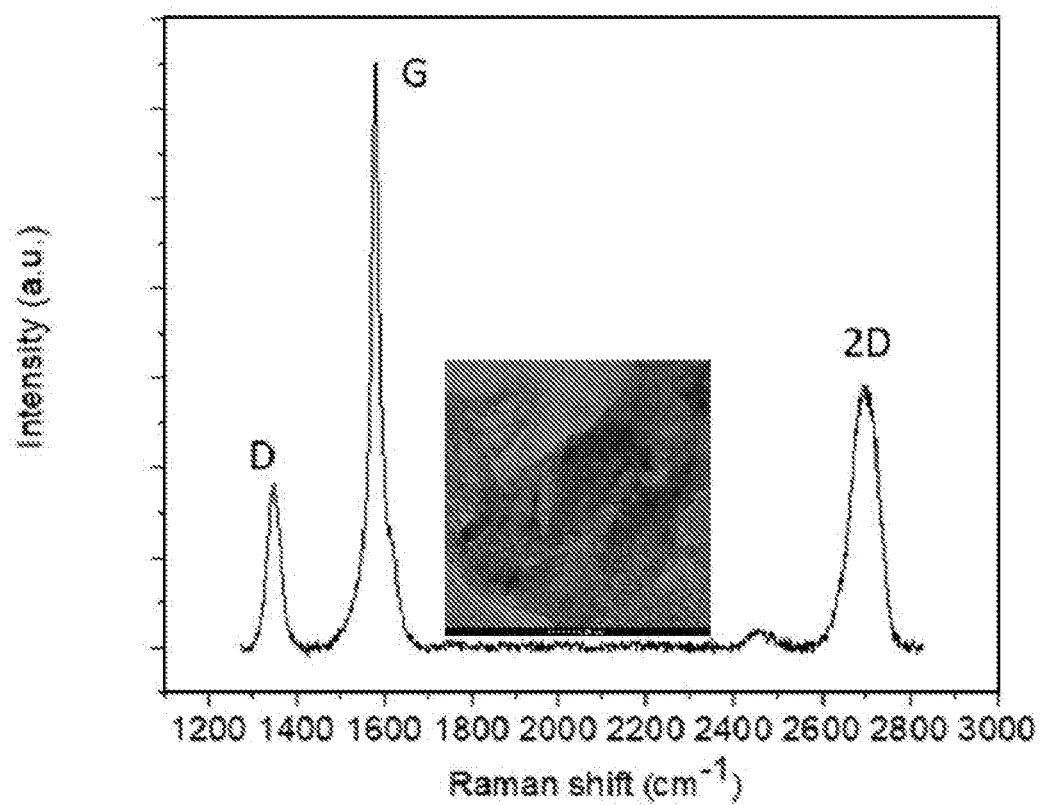
FIG. 9 is the Raman spectrum of graphene aerosol gel ink, the printed ink was post processed (controlled environment annealing, described below) and the Raman spectrum was measured using 532 nm excitation.

In order to probe more into the carbon-carbon bonding characteristics of the printed devices, Raman spectroscopic measurements were performed on the aerosol gel ink and FIG. 9 shows the vibrational spectrum of the aerosol gel lattice that is shown in FIG. 8 (the spot corresponding to the image shown in the inset was referred to the measurement site). Appearance of G peak (~1580 cm$^{-1}$) and 2D peak (~2700 cm$^{-1}$) signifies the graphitic bonds present in the structure. As shown in FIG. 10 of the multi-layer graphene lattice, the intensity of 2D peak is expected to be smaller than the intensity of G peak due to its different band structure from the single layer graphene (linear band structure with Dirac point). The D-peak, positioned around ~1340 cm', is assigned to the defect-induced peaks. Due to its quasi-3D random structure and number of defects in the structure, this peak is expected to arise in the Raman spectrum of the ink.

The printed micro-supercapacitors are tested on their electrochemical performances with a Gamry Instrument interface 1010E potentiostat/galvanostat arrangement in a potential window of 0V and 1V. The electrolyte used in the cell was an ionic liquid electrolyte, namely, 1-ethyl-3-methylimidazolium tetrafluoroborate (EMIBF$_4$, an organic electrolyte). This is a room temperature ionic liquid (IL) that has wide range of applications, including calibration of redox probes used to study electrochemical transport mechanism, evaluating the single electron or multielectron redox processes, charge shuttling in electrical double layer capacitors (supercapacitors) and the reliability study of electrode-electrolyte interface to name few.

Cyclic voltammetry analysis of the printed supercapacitors was performed at various scan rates (from 100 mV/s to 2,000 mV/s) between 0V and 1V polarity applied to the two sets of finger electrodes. The rectangular current vs. voltage characteristics (especially at several of the lower scan rates, even it holds true for 1,000 mV/s scan rate) demonstrated the characteristics of electrochemical double layer capacitive nature. The measurement was reliable over several hundreds of cycles of operation at each of the lower scan rates, indicating the stability of the electrode-electrolyte interface. At higher scan rate (such as 2,000 mV/), the current vs. voltage characteristics becomes somewhat distorted from its ideal rectangular shape that needs understanding is needed to improve.

The areal capacitance ($C_S$) of the micro-supercapacitors could either be measured from the CV curves with different scan rates or from the galvanostatic charge-discharge characteristics (discussed later). These are micro-supercapacitors and they exploit the graphene aerosol gel with randomized structural signatures. Therefore, instead of extracting the volumetric or gravimetric capacitance, an aerial capacitance will be more appropriate to consider.

Figure 10B:
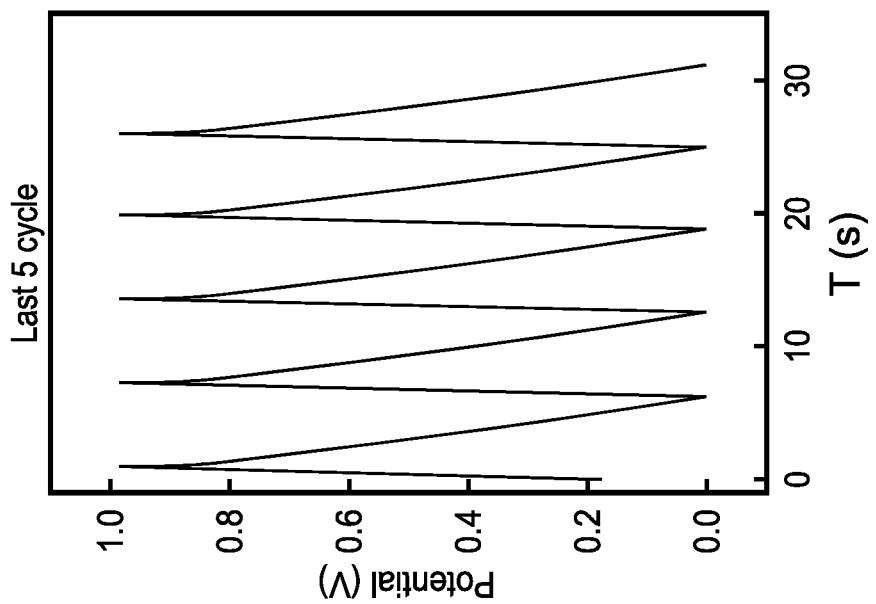
FIG. 10b is a chart depicted the Galvanostatic charge-discharge characteristics of the micro-supercapacitor cells for five representative charging cycles and discharging cycles in the final stages of 10,000 cycles.
Figure 10A:
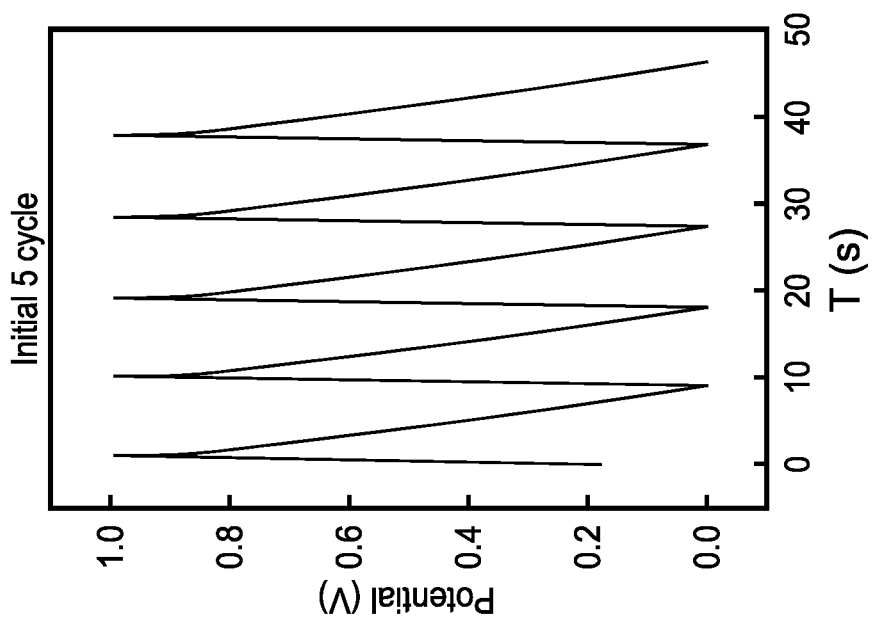
FIG. 10a is a chart depicting the Galvanostatic charge-discharge characteristics of the micro-supercapacitor cells for five representative charging cycles and discharging cycles in the initial stage.

FIGS. 10a and b show the charge-discharge characteristics of the micro-supercapacitor using galvanostatic measurements. A constant current density of 6 µA cm$^{-2}$ was used for the measurements.

The areal capacitance of the micro-supercapacitors is given by $$C_S = I/A\left(\frac{dV}{dt}\right)$$

where, I is the applied current, A is the total area of the printed electrode, and (dV/dt) is the slope of the discharge curve in the galvanostatic charge-discharge characteristics. The micro-supercapacitors were cycled with 10,000 cycles. FIG. 10a shows the first five charging and discharging cycles and FIG. 10b shows the last five charging and discharging cycles during the 10,000 cycles of operation with 6 µA cm$^{-2}$ current density. Several things are observed from these experiments: First, both the charging and discharging times are very fast (less than 10 seconds, in fact the charging time is less than 5 seconds). Second, unlike the performance of batteries, both charging and discharging characteristics are perfectly linear. Comparing the relative discharge capacities from the initial discharge cycle and final discharge cycle, the micro-supercapacitors exhibited more than 80% capacity retention over 10,000 cycles of operation. An initial discharge capacity of 60 µF cm$^{-2}$ was obtained in single micro-supercapacitor cell. The results demonstrate excellent performance and promising applications of graphene aerosol gel-based printed micro-supercapacitors such as IoT domains.

FIG. 11 shows the expansion of the materials discovery to nano carbon composites and their applications to manufacturing functional inks and additively manufactured energy devices (supercapacitors and battery devices). The composites and composite inks comprise 1D nanotubes, 2D graphene, quasi-3D graphene aerosol gel, and the doped carbon nanomaterials by elements such as nitrogen, sulfur, and boron.

Example 4—Formulation of Graphene Aerosol Gel Ink

In this example, a graphene aerosol gel ink was prepared and the physical characteristics and properties of interdigitated electrodes tested.

Materials Characterization

The microstructure of the graphene aerosol gel particles was studied using a Philips CM-100 transmission electron microscope at the accelerating voltage of 100 kV. The TEM specimen was prepared directly on the TEM copper grid by dipping the copper grid directly into the synthesized GAG ink. Surface morphology and the uniformity of the printed electrode were measured with a Hitachi field emission scanning electron microscopy (FESEM). Raman (Renishaw Invia Raman Microscope, excitation wavelength 532 nm) and XPS spectrum ((PHI 5000 Versa Probe II, Physical Electronics Inc.) were directly measured on the printed device to determine the phase and elemental analysis. The XPS spectrum was achieved with a combination of electron and argon ion flood guns. The X-ray beam size was 100 µm and survey spectra were recorded with pass energy (PE) of 117 eV step size 1 eV and dwell time 20 ms, whereas high-energy resolution spectra recorded with PE of 23.5 eV, step size 0.05 eV and dwell time 20 ms.

Aerosol Gel Ink Preparation

GAG powder synthesized by the detonation method comprised pristine graphene nano-sheet agglomerates. Thus to disperse the agglomerates, probe sonication was employed for 30 min in ice bath conditions with an ultrasonic probe (500 W, 20 kHz, Q500 sonicator, USA). 250 mg of GAG powder was dispersed in 50 ml ethanol, and 1 w/v % ethyl cellulose (EC, Sigma-Aldrich, 4 cP grade measured in 80:20 toluene: ethanol at 5 wt %, 48% ethoxy) was used as an emulsifier. The suspension was then filtered through a 5-micron glass fiber syringe filter to remove the bigger GAG particles. The collected suspension was then flocculated by adding a NaCl aqueous solution (0.04 gm/ml in deionized water) followed by vacuum filtration using a 0.45-micron nylon filter. The obtained GAG/EC paste was then dried using a hot plate at 70° C. The ink was prepared by homogenously suspending the GAG/EC powder in cyclohexanone and terpinol (volume ratio of 85:15) followed by bath sonication at a concentration of 70 mg/ml.

Inkjet Printing of Interdigitated Electrodes (IDEs)

The interdigitated electrodes (IDEs) of MSCs were patterned on a flexible substrate using an ink-jet printer (SonoPlot, Microplotter II, USA) with a 20-micron nozzle size glass tip at room temperature. The substrates were thoroughly cleaned via bath sonication in an acetone and methanol mixture and dried by blowing off with nitrogen gas before printing. The printed electrodes were then heat-treated at 350° C. for 2 hours in an $N_2/H_2$ mixture (5% hydrogen in nitrogen) to burn off the organic binder.

Electrochemical Performance

Electrochemical performance of printed micro-supercapacitors was tested using a Gamry interface 1010 E potentiostat/Galvanostat in the potential window of 0-1 volts using the 1-ethyl-3-methylimidazolium tetrafluoroborate (EMIM-BF4, Sigma Aldrich) organic electrolyte. The areal ($C_A$), volumetric ($C_V$) capacitance and equivalent series resistance ($R_{ESR}$) measured from the galvanostatic charge-discharge curve using equations (1), (2) and (3)

$$C_A = \frac{I}{A\frac{dv}{dt}}. \quad (1)$$

$$C_V = \frac{I}{V\frac{dv}{dt}} \quad (2)$$

$$R_{ESR} = V_{drop}/2I \quad (3)$$

where the parameters I, A and V are the applied current, total area of the printed electrode fingers, total volume of the fingers respectively. The dv/dt is the slope of the discharge curve, and $V_{drop}$ is the voltage drop at the beginning of the discharge cycle.

Results and Discussions

Thermogravimetric analysis (TGA) was carried out to measure the graphene content in the processed GAG/EC powder. The TGA showing the change in mass as function of temperature denoted the decomposition of the surfactant at onset temperature ~250° C. The significant change in the mass (30 wt %) occurred from 250° C. to 350° C. indicating the complete decomposition of the surfactant into aromatic compounds. Thus, the GAG/EC powder comprised 70 wt % of graphene. The GAG/EC powder was suspended further in cyclohexanone/terpinol mixture (85:15 volume ratio) to prepare the ink for inkjet printing.

Figure 12A:
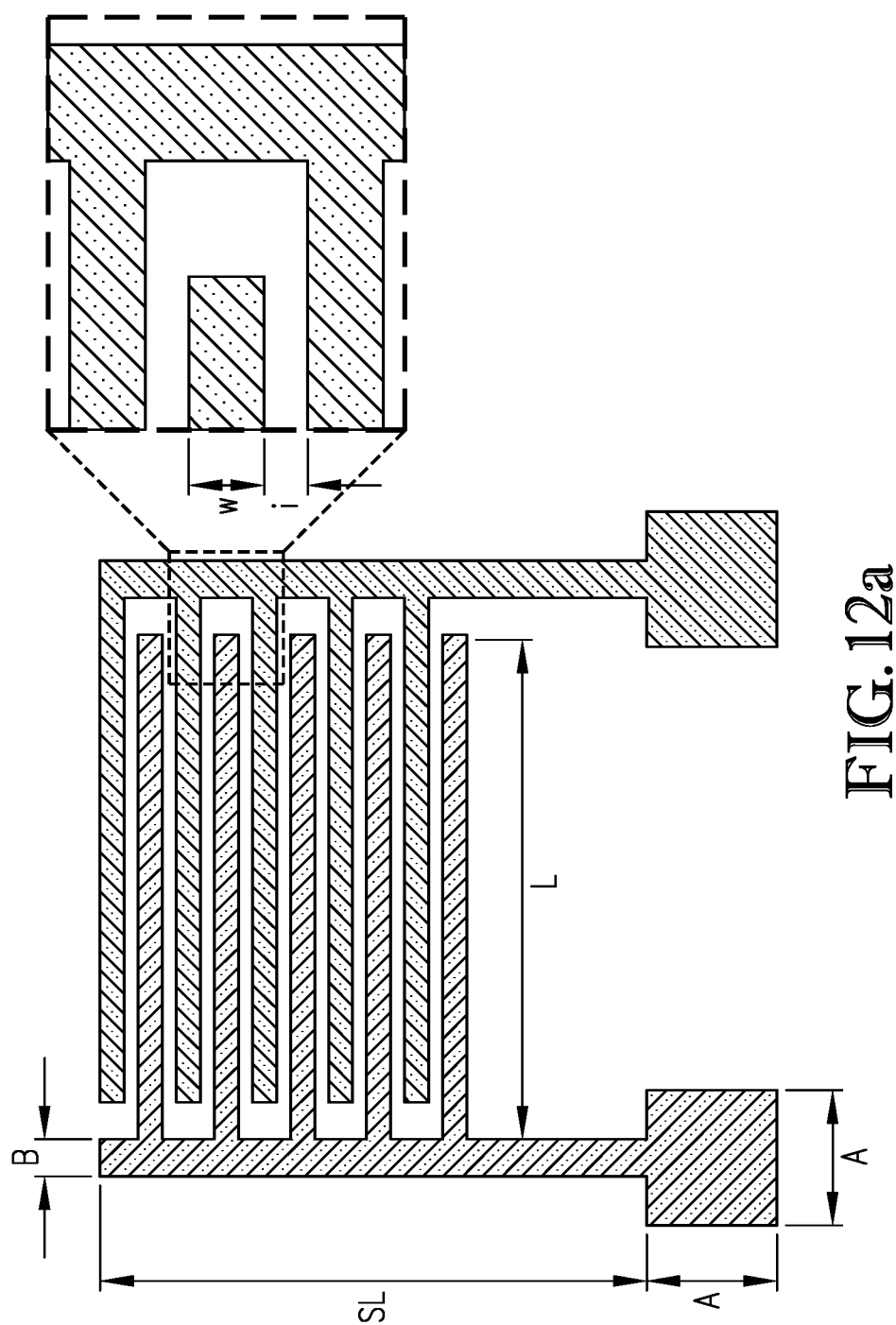
FIG. 12a is a schematic design of an inkjet-printed interdigitated micro-supercapacitor.
Figure 12B:
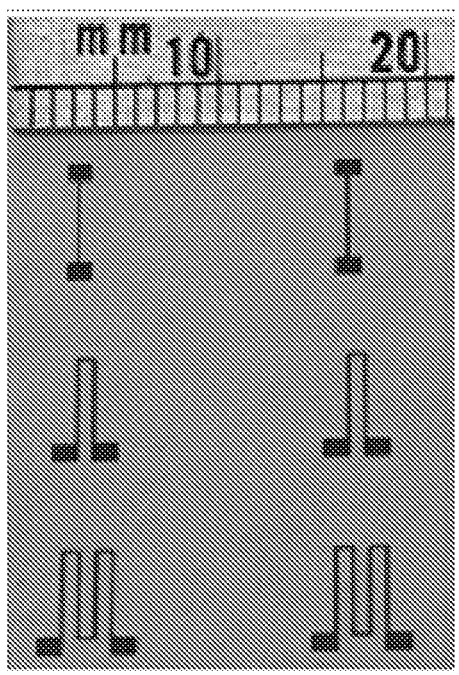
FIG. 12b is a photograph of a resistive element printed on a flexible polyimide substrate.

The formulated ink showed prolonged stability and printability. FIGS. 12a and b depict optical images of inkjet-printed interdigitated μ-SC and resistive elements respectively, on the flexible polyimide (25-μm thick) substrate. Geometrical dimensions of the printed devices are provided in Table 1.

TABLE 1

Geometrical measurements of the inkjet printed micro-supercapacitor

| | |
|---|---|
| Number of Interdigital fingers (N) | 16 |
| Width (w) | 160 μm |
| Length (L) | 4.3 mm |
| Interspace (i) | 80 ± 2 μm |
| Finger Thickness | 236 nm |
| SL | 4.2 mm |
| A | 900 μm |
| B | 315 μm |
| Total Surface (w × L × N) | 0.11 mm² |

Figure 12C:
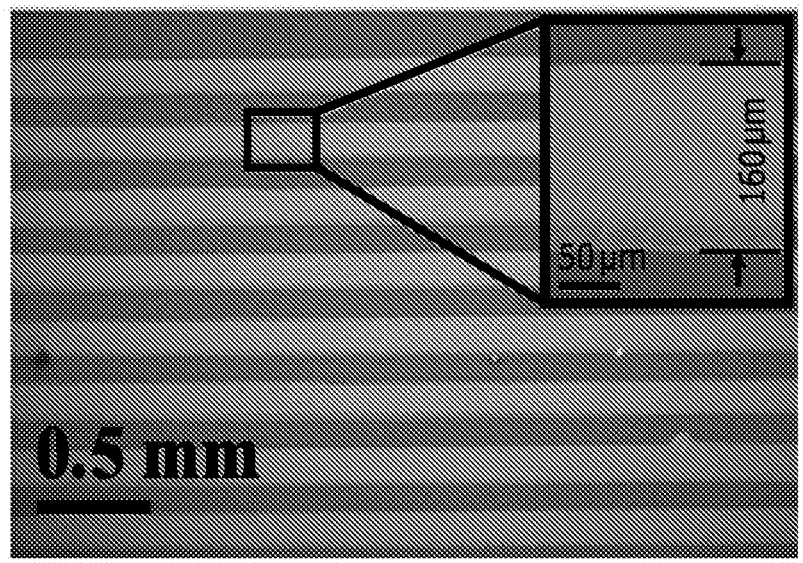
FIG. 12c is a high resolution SEM image of the inkjet-printed fingers, with the inset figure showing the higher magnification of one such finger demonstrating the width and uniformity.
Figure 12D:
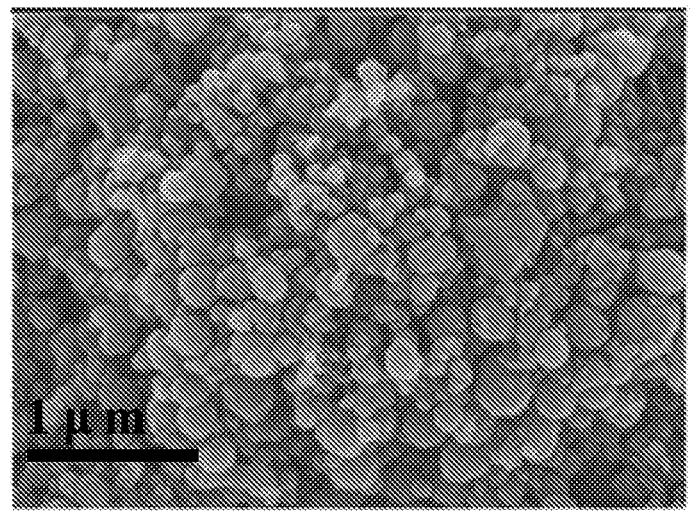
FIG. 12d is a SEM image showing the surface morphology of the printed finger showing sphere-like graphene aerosol gel particles.

To determine the homogeneity of the printed pattern the SEM and AFM images (SI-II) were recorded. As can be seen from the SEM image of FIG. 12c, the printed patterns are highly uniform and free from the coffee ring effect. Thus, during the printing process ink flow was consistent and free of agglomeration resulting the good rheological properties of the formulated ink. The printability of the ink was scrutinized by printing multiple devices with a double number of fingers. All the printed patterns have shown good homogeneity. Further, a high-resolution image of the printed electrode surface was recorded by SEM to study the surface morphology. See, FIG. 12d. The surface of the printed electrode comprised spherical particles, forming a highly porous surface. Such porous morphology favors the storage capacity.

Microstructural Characterizations

Figure 13:
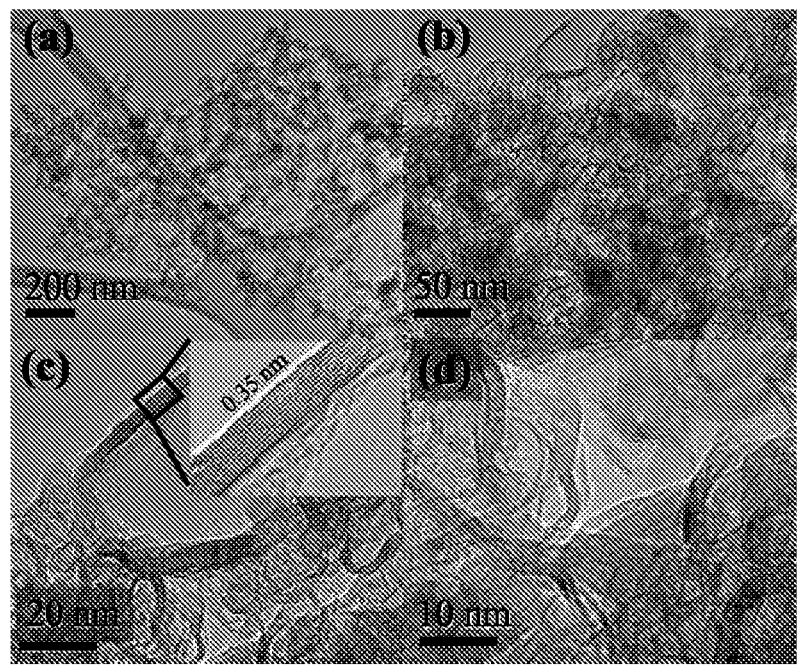
FIG. 13 depicts four successive high-resolution TEM measurement for the microstructural characterization of graphene aerosol gel (GAG): (a) shows the aggregate of graphene nano-sheets suspended on the TEM copper grid; (b) shows a higher magnification image of graphene nano-sheets demonstrating the higher contrast at the boundary with respect to the center of the sheets; (c) shows a high-resolution image of one such nano-sheet showing the fringe/stripe-like microstructure at the boundary with the inset image showing that the stripes are basically formed by the terminating edge of the graphene sheet; and (d) shows the representative domination of stripe-like microstructure present in the ink.

The microstructure of the GAG powder represented in high-resolution TEM measurements are shown in FIG. 13. In FIG. 13, (a) shows the aggregates of graphene nanosheets (GNS) with a near-uniform size distribution close to 100 nm. It is noteworthy that the edges of the GNS have darker contrast, as shown in (b), with respect to the center of the sheet. As evident from the high magnification image of (b), the boundary of the GNS basically contains a shell-like structure where the shell is formed by edge terminated graphene sheets, as shown in the inset image of (c). The randomly oriented sheets merge to form inherent nano porous system i.e. aerosol gel-like structure. The abundance of the edge terminated graphene, as shown in (d), resembles the morphology of the carbon onion, where the graphene sheets are arranged in concentric fashion to form a closed multi-shell structure. In the present case, the shell structure was confined to the edges of the particle only, thus the peculiar microstructure could benefit the electrochemical energy storage due to inherit porosity.

Raman Spectrum of Graphene Aerosol-Gel

Raman spectroscopy is used in a persuasive manner as a nondestructive, high throughput characterization tool for the different $sp^2$ carbon materials. The unique band structure of graphene led to evolving the intense Raman bands due to resonant phonon scattering. Thus, the careful analysis of the Raman spectrum was used to unveil significant microstructural aspects pertaining to defects, stacking order, number of layers, doping, stress and thermal conductivity of graphene. The Raman spectrum of the GAG particles recorded at room temperature fit with the Lorentzian function and contains three intense Raman bands centered at 1351 $cm^{-1}$, 1583 $cm^{-1}$ and 2700 $cm^{-1}$. These optical Raman active phonon modes are typically assigned as D, G and 2D bands and attributed to $A_{1g}$, $E_{2g}$ and overtone of $A_{1g}$ phonon modes respectively. Additionally, two weak Raman bands at 1622 $cm^{-1}$ and 2452 $cm^{-1}$ were also present.

These phonon modes were assigned previously as D', D+D" bands, respectively. The origin of the D' band is due to the intravalley double resonance (DR) scattering process around the K (or K) point of the Brillouin zone. However, the D+D" mode activated from the combination of the LA branch phonon at 1100 cm' and D phonon at the K point of the Brillouin zone. The emergence of an intense 2D band is the signature of graphitized carbon. Additionally, the line shape of the 2D band fit very well with a single Lorentzian function, similar to the 2D band in the single-layer graphene (SLG). However, the upshift in wave number ~20 cm' and higher full width at half maxima (FWHM) with respect to the SLG 2D band was consistent with turbostatic stacking of the graphene layers in the GAG.

Moreover, the intensity of the D band is generally correlated with defect density existing in the form of structural defects and disordered edges due to the loss of translation symmetry. The microstructure of the GAG, as seen from the high-resolution TEM images, comprises a shell-like structure with an average size distribution of 100 nm. The boundary of the shell is confined by edge-oriented graphene sheets, which persist substantially in the GAG morphology. Thus, intuitively, a high magnitude of the I(D)/I(G) is expected in the GAG due to significant amount of exposed edges as shown previously in onion like carbon. On the contrary, the lower magnitude of I(D)/I(G) ~0.2, implying not only the lower concentration of structural defects, but also that the edges persevered the translation symmetry to a good extent. Thus, the edges have either zig-zag or arm-chair ordering of the carbon atoms with a lower amount of edge defects. It has been shown previously that zig-zig edges do not contribute effectively to the D band intensity due to the conservation of momentum, implying that the stripe like structure comprises a substantial density of edge-oriented graphene sheets with arm-chair ordering of the carbon atoms.

X-Ray Photoelectron Spectroscopy

The chemical purity of the GAG was analyzed in XPS spectrum recorded from the surface of the printed device. The survey spectrum showed only photo peaks relevant to C1s carbon and very low concentration of the oxygen. The asymmetric shape of the XPS band shows deconvolution into the three components. The greater intensity of the XPS band is shared by the $sp^2$ hybridized states (284.05 eV) stemming from the C=C of the hexagonal network of the carbon atoms further confirmed the chemical purity of GAG. The $sp^3$ hybridized state (284.7 eV) also exist in the XPS spectrum with fair concentration (22%) along with minimal concentration of C—O groups. It could be referred to the size and considerable amount of graphene edge states, which are chemically more active to react with oxygen.

Electrochemical Performance

The electrochemical performance of the printed GAG μ-SC examined by cyclic voltammogram (CV) at different scan rates, showed a potential window from 0.0 to 1.0 volt. The typical rectangular shape of the CV curves indicated the ideal double-layer capacitive characteristics of the printed μ-SC. The rectangular shape of the CV curve persisted in linear fashion for high scan rates measured up to ~2 V/s. However, the rounded corners implied the significant magnitude of the equivalent series resistance (ESR) existing in the printed device. The ESR value was calculated from the voltage drop ($\Delta V$=36 mV at 5 μ-amp/cm$^2$) at the beginning of the discharge curve using the equation (2). The magnitude of $R_{ESR}$ was found to be ~45 kΩ. The high magnitude of ESR raised from contact resistance, electrode-electrolyte interface resistance, and bulk electrode resistance. The high porosity of the GAG electrode could have been a major contributor to the ESR magnitude. Further, the charge-discharge (CDC) profile was measured at different current densities of the MSC. The CDC represents the typical triangular shape profile but with renowned asymmetrical shape particularly at lower current densities, however at higher current densities the triangular shape became more symmetrical. The areal ($C_A$) and volumetric ($C_v$) capacitance was calculated from the slope of the galvanostatic discharge profile using equation (2), (3) as a function of current density. The stability of the printed supercapacitor was tested in an extended number of CDC cycles at a constant current density of 6 micro-amp/cm$^2$. The device showed good capacitance retention ~80% after 10,000 cycles.

Figure 14A:
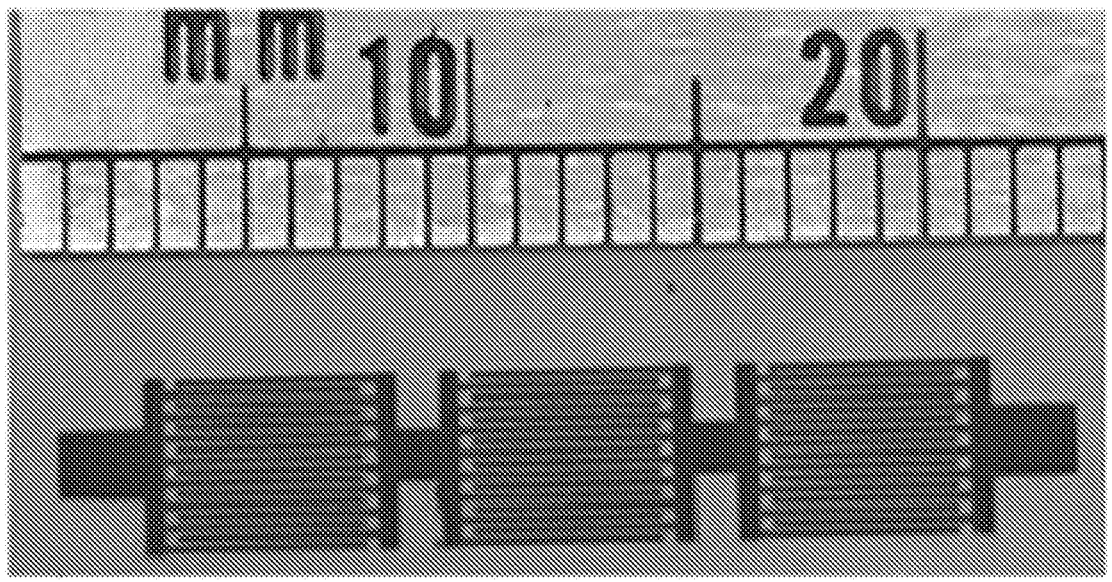
FIG. 14a is a photograph depicting three micro-supercapacitors printed in series.
Figure 14B:
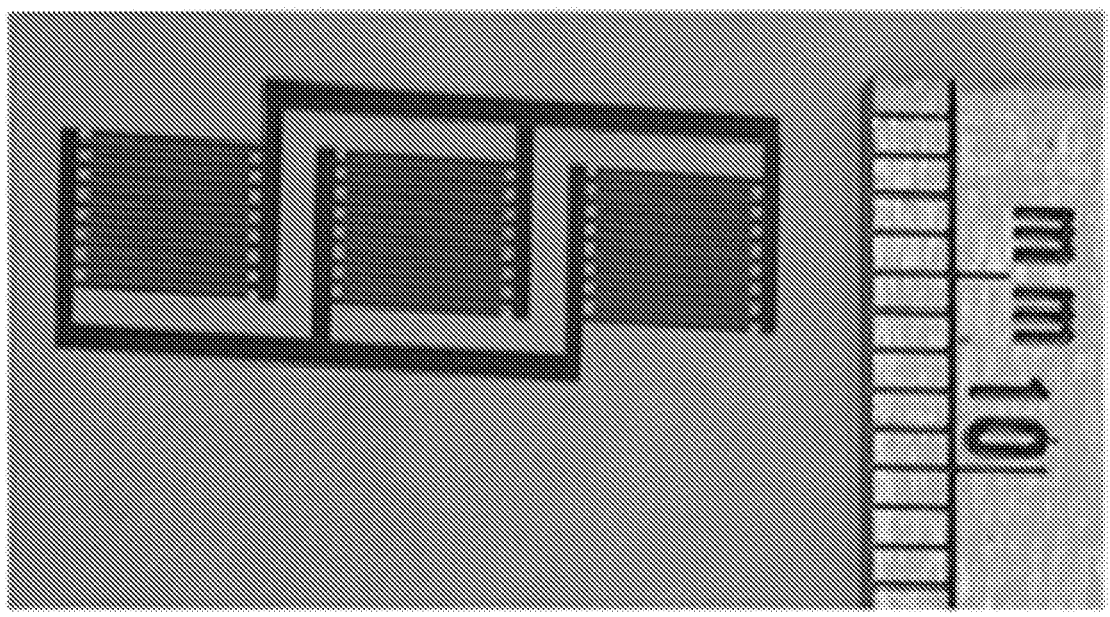
FIG. 14b is a photograph depicting three micro-supercapacitors printed in parallel.

In order to increase the power density for practical applications, generally multiple cells are assembled in series and parallel combination, as shown in FIGS. 14a and b. The series combination, as anticipated, showed a decrease in capacity by a factor of three when operated in the voltage window of 0-1 volt, while showing a small increase in charge-discharge time when operated up to 3 volts. Similarly, the parallel arrangement showed an increase in capacitance by a factor of three compared to a single cell. Thus, formulated GAG ink can be used directly to print the multiple devices in series and parallel combination directly in order to tailor the output.

CONCLUSIONS

All the printed patterns showed high uniformity without any apparent stains or coffee ring effect. Thus, good printability and prolonged stability of the GAG ink confirmed the successful ink formulation protocol. The printed μ-SC showed good excellent capacity retention ~80% over extended number of charge-discharge cycles (10,000 cycles) operated at 6 μA-cm$^{-2}$ in a potential window of 0-1 volt. Thus, this approach could pave the gap of mass production of graphene and fabrication of energy storage devices.

We claim:

1. An ink composition comprising a quantity of graphene aerosol gel particles, wherein the graphene aerosol gel particles are prepared by dispersing a quantity of graphene nanosheets in a solvent and surface modifying the graphene nanosheets into the graphene aerosol gel particles using ultrasonication.

2. The ink composition of claim 1, wherein the quantity of graphene aerosol gel particles is dispersed in a liquid vehicle.

3. The ink composition of claim 2, wherein the liquid vehicle comprises a mixture of one or more ketones and one or more alcohols.

4. The ink composition of claim 3, wherein the liquid vehicle comprises from about 60% to about 99% by weight of cyclohexanone, and from about 1% to about 35% by weight of terpineol.

5. The ink composition of claim 1, wherein the ink comprises from about 1 to about 500 mg/ml of a surfactant comprising ethyl cellulose or nitrocellulose.

6. The ink composition of claim 1, wherein the ink comprises from about 0.01 to about 10 mg/ml of the graphene aerosol gel particles.

7. The ink composition of claim 1, wherein the composition further comprises from about 1 to about 30 mg/ml of graphene or graphene oxide particles.

8. The ink composition of claim 1, wherein the graphene aerosol gel particles have a D90 particle size of from about 0.45 to about 10 microns.

9. The ink composition of claim 1, wherein the graphene aerosol gel particles are doped with at least one of nitrogen, sulfur, and boron.

10. An electronic device comprising one or more traces printed with the ink according to claim 1.

11. The electronic device according to claim 10, wherein the electronic device is a capacitor, supercapacitor, microcapacitor, ultracapacitor, or pseudocapacitor.

12. A method of forming an electronic device comprising printing a conductive trace using the composite ink of claim 1 onto a substrate.

13. The method of claim 12, wherein the substrate comprises a flexible substrate formed from a synthetic resin material.

14. The method of claim 13, wherein the synthetic resin material comprises a polyimide.

15. The method of claim 12, wherein the method further comprises annealing the conductive trace at a temperature of from about 200° C. to about 500° C. under an inert atmosphere.

16. The ink composition of claim 1, wherein the ink further comprises a quantity of carbon nanotubes.

17. The ink composition of claim 1, wherein the graphene aerosol gel particles comprise randomly oriented graphene nanosheets that have been merged to form an inherent nano porous system.

18. The ink composition of claim 17, wherein the graphene nanosheets comprising the graphene aerosol gel particles particles are arranged in concentric fashion to form a closed multi-shell structure.

19. The ink composition of claim 1, wherein the graphene aerosol gel particles have a near uniform size distribution.

* * * * *